Figure 1:
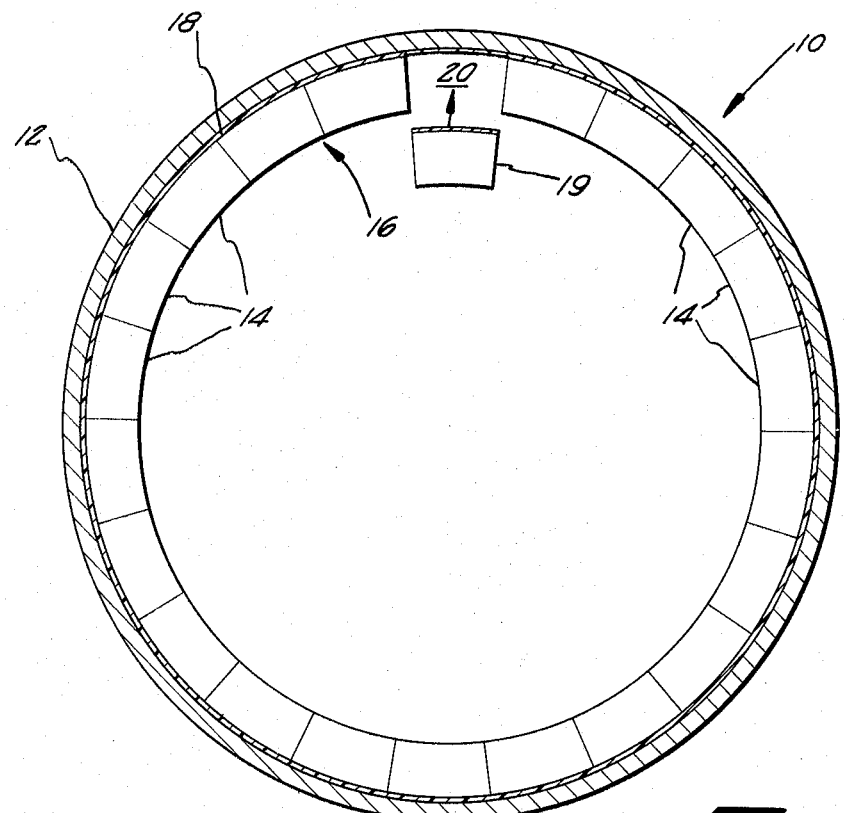

April 19, 1966            J. M. SAUER            3,246,442

ROTARY KILN LINING

Filed Oct. 1, 1962

INVENTOR.
JOHN M. SAUER
BY
Christie Parker & Hale
ATTORNEYS.

United States Patent Office 3,246,442
Patented Apr. 19, 1966

3,246,442
ROTARY KILN LINING
John M. Sauer, Victorville, Calif., assignor to American Cement Corporation, Los Angeles, Calif., a corporation of Delaware
Filed Oct. 1, 1962, Ser. No. 227,288
4 Claims. (Cl. 52—747)

This invention relates to refractory bricks for lining the interior of a rotary kiln shell and to methods for lining such a shell.

A typical industrial rotary kiln, such as is used in the cement and other industries, is a brick-lined steel cylinder, slightly inclined from the horizontal. The kiln is rotated slowly, say 1 or 2 r.p.m., about its longitudinal axis. A burner supplies hot gas to the lower end of the kiln to furnish the heat required for the operation. Raw material is fed into the upper, colder end, and the clinker or other treated material is discharged from the lower, hot end.

Periodically, the refractory bricks become worn, and the kiln shell must be relined with new brick. After the old bricks are removed, the replacement bricks are inserted inside the kiln shell by being fitted in a circumferential ring, and are secured in place by the locking effect of the last brick inserted to complete each ring. In the past, jacks and scaffolding have been used to hold in place the bricks of a partially completed ring while the bricks required to complete the ring are inserted in place. This has been a time-consuming and cumbersome technique, which not only incurs a substantial labor cost, but adds to overall operation costs by increased down time for the kiln.

This invention provides a method for installing refractory bricks without requiring any special scaffolding or jacks to hold the bricks in place as they are installed. This reduces the amount of labor and equipment required to reline a kiln, and also reduces kiln down time.

In terms of method, the invention includes bonding a series of bricks to the interior surface of a kiln shell with an adhesive to form a circumferential ring of bricks. The bricks in the ring are packed tightly together, and the last brick in the ring is wedged into place to lock the bricks in compression against the interior of the shell independently of the adhesive. This latter step is necessary because ordinarily the operating temperature of the kiln is so high that the adhesive is burned away.

The adhesive can be applied either to the interior surface of the kiln, or to the surface of the brick, or to both.

In terms of product, the invention provides a refractory brick which has a curved surface to match the interior surface of the kiln shell. A coating of adhesive is disposed on the curved surface of the brick so that the brick can be pressed and stuck directly in place in the kiln shell without any other supports being required.

Preferably, the adhesive coating on the brick is protected by a removable cover, such as a sheet of paper or plastic. The cover permits the bricks to be stacked prior to use without any problem of sticking together.

Figure 2:
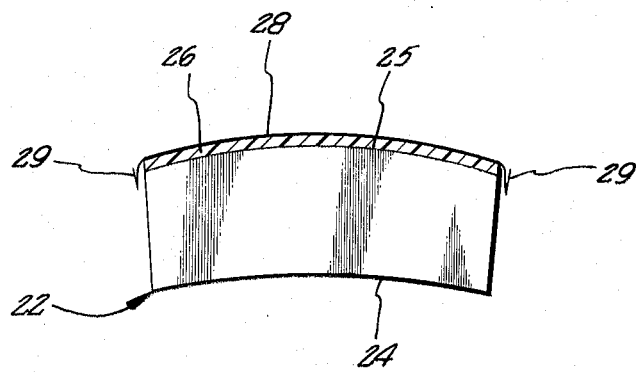

These and other aspects of the invention will be more fully understood from the following detailed description and the accompanying drawings, in which:

FIG. 1 is a transverse fragmentary sectional view of a typical rotary kiln shell being lined with refractory brick in accordance with the invention; and FIG. 2 is an elevation of a refractory brick having an adhesive coating and a protective cover.

Referring to FIG. 1, a rotary kiln 10 includes an elongated cylindrical housing or tube 12, which is mounted by conventional means (not shown) to rotate about its longitudinal axis, which is disposed at a slight angle to the horizontal. In lining the shell, a set of refractory bricks 14 are disposed side by side, or end to end, to form a circumferential ring 16 around one portion of the kiln interior. The bricks are held in the position shown in FIG. 1 by a layer of adhesive 18 disposed between the bricks and the shell interior. As shown in FIG. 1, the ring is almost completed except for one missing brick 19, which is the locking brick. The remaining bricks in the ring are jammed tightly together and the locking brick is forced into the remaining space 20 to place the entire ring in compression so it tends to expand outwardly and tightly against the shell. Thus, even though the adhesive is later burned away in the subsequent operation of the kiln, the bricks are locked firmly in place. Additional rings of bricks are installed as just described, until the entire shell interior is lined.

The adhesive may be any suitable material which will at least temporarily bond the bricks to the shell. Naturally occurring adhesives such as starch, dextrenes, and proteins may be used, but they sometimes fail to provide the desired bond between brick and shell during the installation of a ring. Other naturally occurring materials such as asphalt, shellac, natural rubber, and sodium silicate are better. However, I have found that the best type of adhesives are synthetic materials such as thermoplastic and thermosetting resins. Examples of the former are cellulose esters and ethers, acrylic esters, polyamides, polystyrene, and polyvinyl alcohol and its derivatives. Examples of thermosetting resins are urea, melamine, phenol, resorcinol, furan, epoxy, and unsaturated polyester resins.

Referring to FIG. 2, a refractory brick 22 includes a body 24 of conventional refractory material having a convex outer surface 25 to match the interior surface of the shell kiln. A layer of adhesive 26 is disposed on the convex surface of the brick. A protective cover 28 is disposed on the layer of adhesive to prevent the adhesive from drying and to permit the bricks to be stacked together without sticking. The ends of the protective cover 28 include folded up tabs 29 to facilitate stripping the cover from the adhesive when the brick is ready to be installed. Preferably, the adhesive is a pressure sensitive type, such as high-molecular-weight elasomer plasticized with a low-molecular-weight of the same material, e.g. polyisobutylene. With the brick of the type shown in FIG. 2, the interior of the shell need not be previously coated with plastic. To install a ring of bricks, the protective cover is stripped from them, and they are pressed against the shell interior so that they are held in place by the adhesive layer. The brick of the type shown in FIG. 2 has the advantage that no additional equipment is required on the jobsite to reline a kiln.

The layer of adhesive 18 in FIG. 1 can be applied either only to the shell, only to the brick, or to both the shell and the brick. The latter procedure is preferred because it usually results in better adhesion of the brick to the shell. The adhesive is applied to the shell first, and if the brick does not already have adhesive on it as shown in FIG. 2, a layer of adhesive is then applied to the brick before pressing it into position. Apparently, the initial contact of the adhesive with the steel shell permits an initial set to take place before the brick is installed, and thereby results in a better gripping action when a coated brick is actually put into place.

I claim:
1. A method for lining the interior of a rotary kiln shell with refractory bricks, the method comprising bonding a series of bricks to the interior surface of the shell with an adhesive to form a partial circumferential ring of bricks retained in place only by the adhesive, the bricks in the ring being packed tightly together, and wedging the last brick into the ring to lock the bricks in compression against the interior of the shell independently of the adhesive.

2. A method for lining the interior of a rotary kiln shell with refractory bricks, the method comprising coating the interior of the shell with an adhesive, bonding a series of bricks to the interior surface of the shell with the adhesive to form a partial circumferential ring of bricks retained in place only by the adhesive, the bricks in the ring being packed tightly together, and wedging the last brick into the ring to lock the bricks against the interior of the shell independently of the adhesive.

3. A method for lining the interior of a rotary kiln shell with refractory bricks, the method comprising coating the bricks with an adhesive, bonding a series of the coated bricks to the interior surface of the shell with the adhesive to form a partial circumferential ring of bricks retained in place only by the adhesive, the bricks in the ring being packed tightly together, and wedging the last brick into the ring to lock the bricks against the interior of the shell independently of the adhesive.

4. A method for lining the interior of a rotary kiln shell with refractory bricks, the method comprising coating the interior of the shell with adhesive, coating the bricks with adhesive, bonding a series of the coated bricks to the interior surface of the shell with the adhesive to form a partial circumferential ring of bricks retained in place only by the adhesive, the bricks in the ring being packed tightly together, and wedging the last brick into the ring to lock the bricks against the interior of the shell independently of the adhesive.

References Cited by the Examiner

UNITED STATES PATENTS

| 1,054,423 | 2/1913 | Kennedy | 52—227 XR |
| 2,230,141 | 1/1941 | Heuer | 52—249 XR |
| 2,300,488 | 11/1942 | Cuno | 52—420 |
| 2,637,995 | 5/1953 | Mann | 52—599 XR |
| 2,829,877 | 4/1958 | Davis | 52—599 XR |
| 2,970,124 | 1/1961 | Drummond | 52—390 XR |

FOREIGN PATENTS 576,628   5/1959   Canada.

FRANK L. ABBOTT, *Primary Examiner.*

HENRY C. SUTHERLAND, *Examiner.*